United States Patent [19]
Gaskin

[11] 3,751,827
[45] Aug. 14, 1973

[54] EARTH SCIENCE TEACHING DEVICE

[76] Inventor: Theodore Alfred Gaskin, 378 Warren Ave., Hawthorne, N.Y. 10532

[22] Filed: June 8, 1971

[21] Appl. No.: 151,101

[52] U.S. Cl. ............................. 35/10, 35/41, 35/42
[51] Int. Cl. ..................... G09b 23/40, G09b 25/06
[58] Field of Search .................... 35/10, 41, 42, 117

[56] References Cited
UNITED STATES PATENTS

| | | | |
|---|---|---|---|
| 727,140 | 5/1903 | Hill et al. | 35/10 |
| 477,633 | 6/1892 | Barringer | 35/10 |
| 3,186,111 | 6/1965 | Lawlor | 35/17 |
| 388,593 | 8/1888 | Smith | 35/17 |
| 2,189,592 | 2/1940 | Perera | 35/41 |

FOREIGN PATENTS OR APPLICATIONS

| | | | |
|---|---|---|---|
| 4,121 | 1913 | Great Britain | 35/41 |
| 545,028 | 2/1932 | Germany | 35/41 |
| 332,359 | 1/1921 | Germany | 35/41 |

Primary Examiner—Wm. H. Grieb
Attorney—Thomas J. Lannon

[57] ABSTRACT

A teaching device comprising a three-dimensional model of a land mass incorporating various geological and topographical formations. The model comprises an assembly of two or more sections taken along parallel vertical planes whereby when the sections are disassembled they disclose selected illustrative subterranean formations, such as various rock strata, oil pools, mineral veins, and the like. When assembled, the outer surface of the model shows selected topographical formations. Each section is made up of matching layers, the thickness of each layer representing an increment in altitude. Thus, when the layers and sections are assembled to form the model, the edges of the faces of the contacting layers form altitude or elevations designated by contour lines. The model may also be utilized to illustrate the correlation between the contour lines and profile map taken on a vertical plane crossed by said contour lines. The individual layers may also be used as templates to draw a topographical map of the terrain at any desired elevation.

2 Claims, 5 Drawing Figures

INVENTORS
THEODORE A. GASKIN

BY Thomas J. Lennon
ATTORNEYS

INVENTORS
THEODORE A. GASKIN

EARTH SCIENCE TEACHING DEVICE

This invention relates to a teaching device in the field of earth science.

An object of the invention is to provide a three-dimensional model of a land mass incorporating various geological formations and other earth facts, whereby the students may visually study such formations and their interrelations.

A further object is to provide a model as described above formed of horizontal layers or segments, each layer representing a desired value of elevation or altitude and its peripheral surface so contoured that when assembled the several layers form a model of mountainous terrain with given altitudes above a base line.

Another object is to provide a model of the type described above wherein the model is cut along at least one vertical plane to form two sections, whereby upon separation of the sections the interior of the land mass is exposed. The sections may be provided with representations of earth formations, such as rock strata, mineral, coal, etc. formations, water and oil formations, and other subterranean formations. Thus, the students may visually observe the various geological formations and their interrelationship below the surface of the earth.

A further object is to provide the model with contour lines, represented by the altitudes of the several layers making up the model. The contour lines on the top of the model can be correlated with a profile cross section taken along a vertical plane to illustrate to the students the relationship between altitudes and profile sections or maps.

Another object is to utilize the segments or layers as templates to draw a contour map of the terrain at any desired altitude or elevation. To properly align or orient the several layers when used as templates to successively draw the contour map, each layer is provided with an orientation means or mark. In the disclosed specific form of the invention, the orientation means comprises aligned apertures or holes passing through each layer, said holes also serving to receive bolt means which maintain the layers in assembled position to form the model. Other orientation mark means may also be provided on each layer.

Other and further objects and advantages of the invention will become apparent from the following description taken in conjunction with the accompanying drawing in which.

The teaching device A (FIG. 1) comprises a three-dimensional model of a land mass incorporating various geological and topographical formations. To visibly disclose subterranean geological formations the model is divided into sections along vertical planes. For descriptive purposes only, the model is illustrated as comprising sections B and C cut on a vertical plane Z along line 3—3 of FIG. 1.

While the model may be an integral casting of suitable plastic, or like material, or each section may be an integral casting and assembled to form the model, it is preferably constructed from a set of complementary and properly contoured layers or segments made of suitable plastic.

Figure 5:
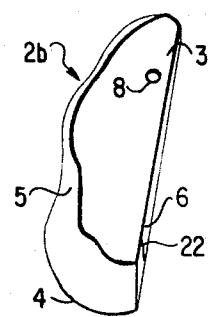
FIG. 5 is a perspective view of a layer making up the model.

Section B comprises layers or segments 2b. The preferred method is to cast each layer in its desired topographical shape and peripherally contoured in accordance with the topography. The thickness of each layer or segment may represent a desired number of feet in altitude or elevation. Each layer comprises two flat parallel surfaces or faces 3 and 4 (FIG. 5) and a peripheral surface 5 which is contoured and formed in accordance with the topographical and geological formations formed in the terrain at the altitudes represented by the particular layer. Peripheral surface 5 comprises a flat portion 6 which coincides with plane Z.

Figure 1:
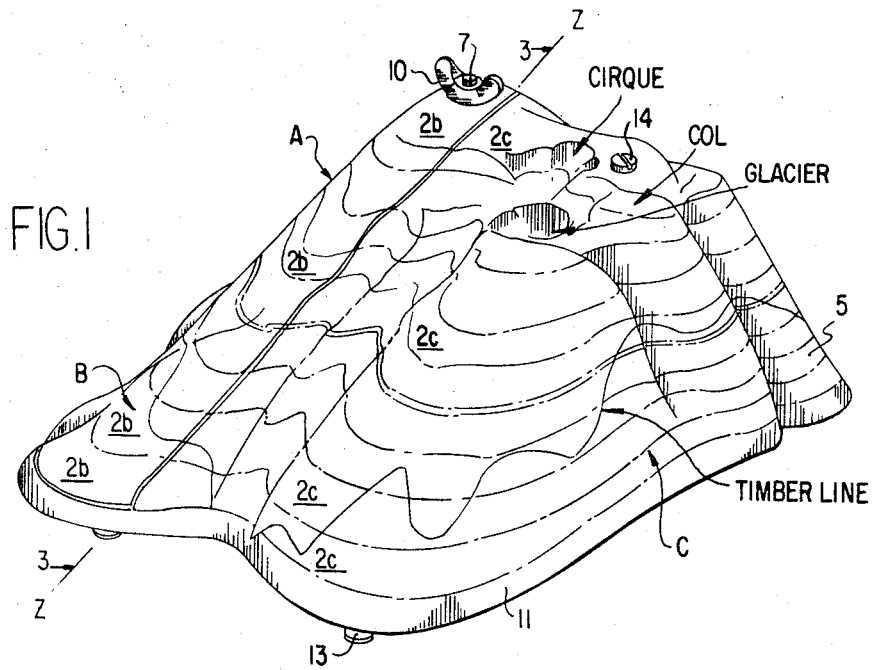
FIG. 1 is a perspective view of the teaching device, which is in the form of a three-dimensional model illustrating various geological surface formations.

Section C is formed of layers 2c, each layer 2c being complementary to its corresponding layer 2b. Each layer 2c has its peripheral surface properly contoured with formations which are continuations of the formations of its matching section 2b. Upon proper assembly of the several sections, the teaching device illustrated in FIG. 1 is formed, and it visibly incorporates all the desired formations which are to be illustrated thereon.

The assembled layers 2b of section B are held together and in proper alignment by a fastening means in the form of a screw bolt 7 passing through a series of properly located and aligned orientation holes 8 in each layer. To facilitate the assembly and disassembly of the layers in section B, a wing nut 10 is provided. It is obvious that other layer fastening means may be utilized. For example, a rod or stud properly fitting holes 8 may be cast integrally with the lowermost layer 2b, or bonded thereto.

To assemble both sections B and C to form the teaching device A, a support base is utilized. The support base comprises a platform 11 properly supported by feet 13. If desired, the platform may be contoured and shaped like the other layers to represent the earth formation of the device at that altitude. Layers 2c of section C are maintained in their properly assembled and aligned positions of platform 11 by a bolt 14 passing through properly located holes 15 in the layers and platform with a wing nut 16 for easy assembly and disassembly. Thus, section C is fastened to platform 11 while section B is removable therefrom.

To align sections B and C in their proper, cooperative positions to form the device A, a key 18 is secured to platform 11, and cooperating alignment slots 19 and 20 are provided in the lowermost layers of sections B and C. Key 18 may be cast integrally with platform 11 or separately bonded thereto.

The assembled teaching device of FIG. 1 may represent a land mass contoured in any desired manner and embodying the desired geological and topographical formations, whereby the students can trace and draw and visibly see such formations and relate them to each other and to the general topography of the land mass. For example, beginning at a lower altitude, the timber line and various rock outcrops may be designated by representative painted areas on the model, or by imprinted suitable terminology. The flow direction of water is illustrated by the V-formations on the model surface. Mountains and snow line may be shown by coloring the model. Such formations as cirques, glaciers, cols, dikes, etc. may be shaped accordingly and identified by imprints. Thus, the students have before them a three-dimensional body visibly showing the various formations and their relationship to one another.

Figure 4:
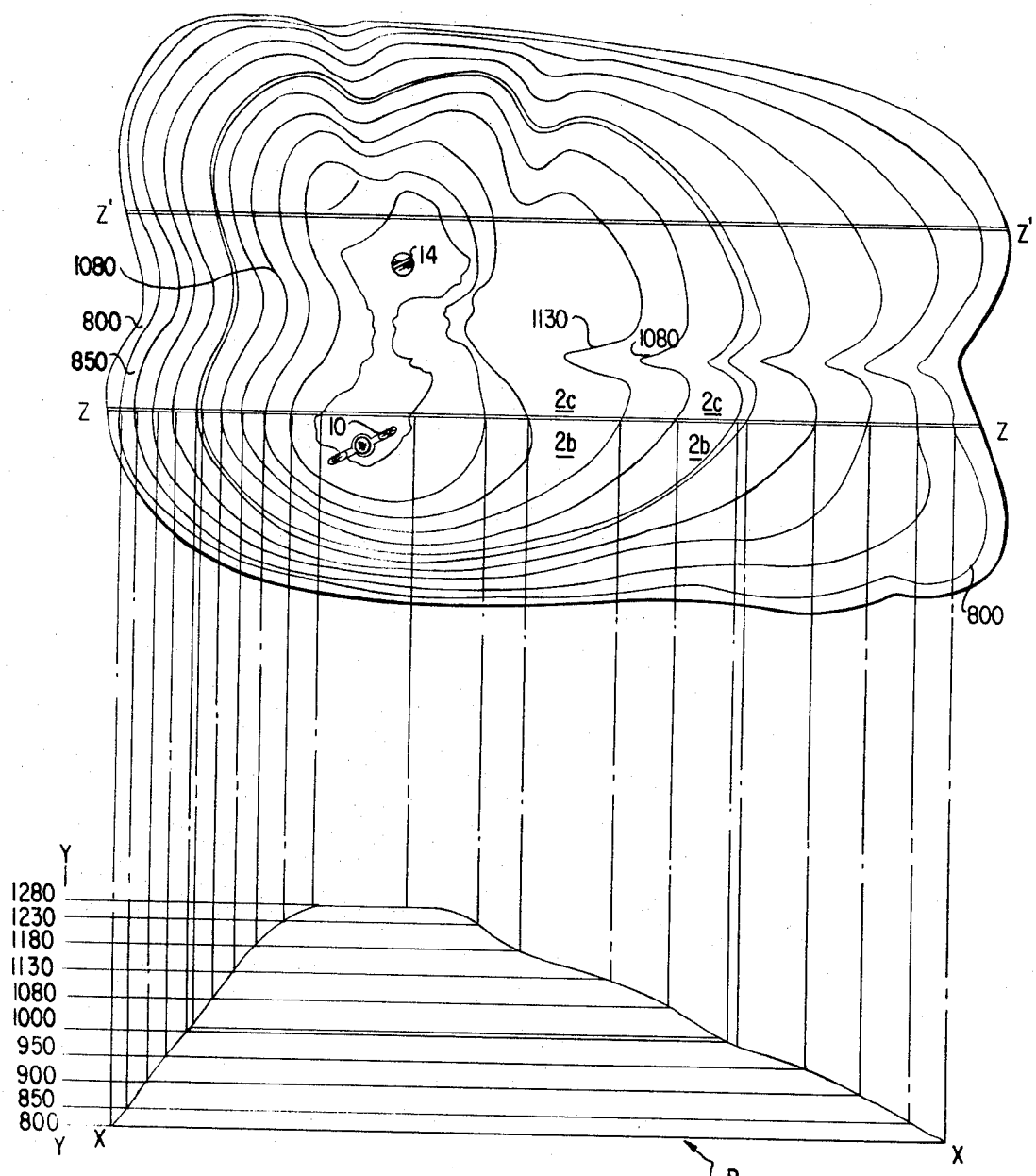
FIG. 4 illustrates the results of utilizing the device to draw a topographical plan view and a profile side view along a desired vertical plane, and further illustrates the correlation between the contour lines and the profile of the section.

Numerical values showing the altitudes at which the above formations occur may be imprinted at the horizontal surfaces 3 and 4 of the several layers as illustrated in FIG. 4. For example, the markings of 800, 850, etc. may be feet above a certain base line.

Figure 2:
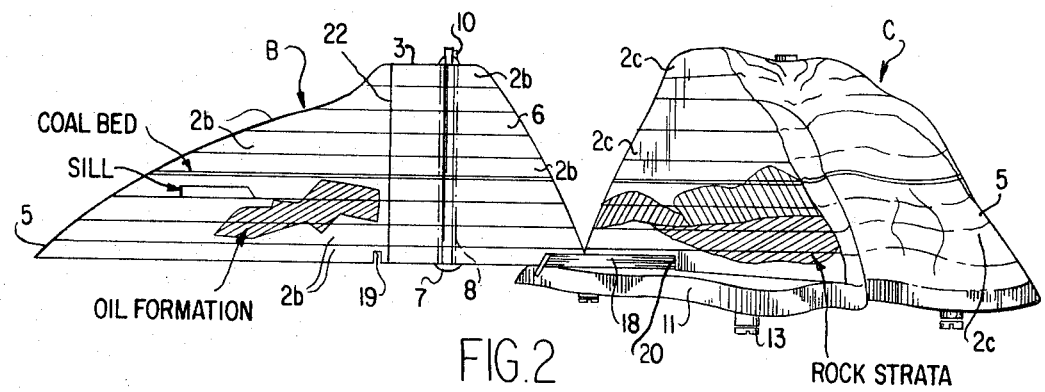
FIG. 2 is an elevational view, partly in perspective, of two adjacent sections of the model separable along the vertical plane passing through section line 3—3 of FIG. 1.
Figure 3:
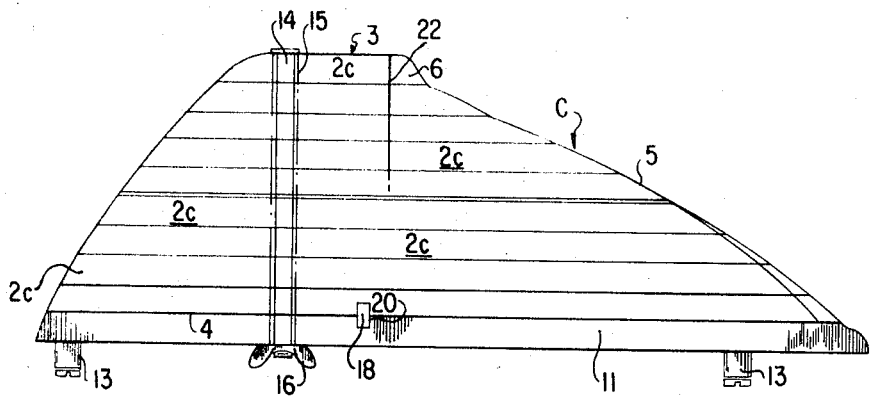
FIG. 3 is an elevational view of the model taken along section line 3—3 of FIG. 1.

In order to illustrate subterranean geological formations, section B is removed from platform 11, and thereby exposing the interior profile of the model. FIGS. 2 and 3 illustrate how the interior of the several layers may be marked up by suitable colored paint, or similar means, to indicate formations, such as coal beds, ores, clay, oil pools, gas pools, and other type formations found in the interior of the earth. The various geological rock strata and their geological ages may also be shown by proper marking and terminology imprints.

An important utilization of the teaching device is its use in illustrating how the contour or altitude lines seen from the top of or above the model, as illustrated in FIG. 4, may be correlated with a profile cross section taken in any given vertical plane. FIG. 4 is a top view of device A with the contour lines 800, 850, etc. clearly shown. To make a profile map at any vertical section or plane of the model, it is only necssary to project the points at which the contour lines intersect the vertical plane onto the corresponding altitude lines in the plane. For example, if the contour map along plane Z—Z is desired (FIGS. 1 and 4), an X-Y graph is drawn with vertical axis Y marked off in altitudes corresponding and correlated to the contour lines at these altitudes. Thus, in FIG. 4, the altitude Y-axis is marked off at altitudes of 800, 850, 900, etc., each respectively corresponding to the contour lines at 800, 850, 900, etc. crossing plane Z—Z. It should be noted that since plane Z—Z is also the plane along which adjacent sections B and C abut, the altitude markings correspond to the thickness of layers 2b and 2c. Upon vertically projecting the intersections of the contour lines 800, 850, 900, etc. with vertical plane Z—Z upon the corresponding altitude lines 800, 850, 900, etc. of the graph, and then drawing a profile line through the intersections of the projected contour points, with their corresponding altitude lines, a profile map of the land mass at plane Z—Z is formed.

To further illustrate the correlation between the contour lines and the profile cross section or map, the students may place the flat vertical surface of section B upon the drawn profile map of FIG. 4 and observe how the projected profile map coincides with the configuration of the vertical surface of section B. FIG. 4 illustrates such coincidence by indicating that the projected contour map as the vertical surface of section B.

Another important utilization of the teaching device is its use in drawing a contour map of any desired portion of the model. It is apparent that each layer 2b and 2c may be used as a template to draw the contour lines at the elevations corresponding to and represented by the layer. Thus a contour map of a portion of the model, or, of the entire model, may be drawn by tracing the peripheral edges of surfaces 3 and 4 of the respective layers. To properly relate the several layers to draw the map, orientation holes are utilized. Thus, to draw a contour map of any portion of the model, the largest layer of that portion is used as the first or base template to trace the contour line presented by its edge. The hole 8 of that layer is also marked on the paper. The next layer to be traced is then placed upon the paper with its hole 8 coinciding with the trace of hole 8 of the previously traced layer. Perfect orientation of the several layers is accomplished by aligning the straight portions 6 of each layer, that is, the position of each layer is precisely determined by its orientation hole 8 and its straight portion 6.

If means other than bolt 7 and holes 8 are used as fastening means, or in addition to holes 8, orientation of the layers to draw contour maps may be had by other orientation means. For example, each layer 2b and 2c may be formed with an orientation mark line 22 placed on its peripheral straight portion 6. The mark line 22 may be imprinted on surface 6 or cast integrally with the layer. As illustrated in FIG. 2 the several mark lines 22 are in alignment when the model is assembled.

While the illustrated embodiment of the teaching device A is shown as having two sections B and C, it is apparent that it may comprise any number of detachable or removable sections, each similar to section B. For example, FIG. 4 illustrates a second vertical plane Z'—Z' along which the device may have a second removable section similar to section B.

Having thus described my invention, it is obvious that various modifications may be made in the same without departing from the spirit of the invention; and therefore, I do not wish to be understood as limiting myself to the exact forms, constructions, arrangements and combinations of parts herein shown and described.

I claim:

1. A geological teaching device in the form of a three dimensional model of a land mass, said model comprising a plurality of vertically oriented sections, adjacent sections having vertical surfaces abutting each other at a mutual vertical plane taken through the model, the outer surfaces of the sections embodying representations of desired topographical formations, and the interior of the sections along said vertical planes embodying representations of desired subterranean geological formations, each of one or more sections comprising a set of superimposed and aligned layers, each layer having top and bottom faces and a peripheral surface, a portion of said peripheral surface being a flat vertical surface and the rest of said peripheral surface being contoured in accordance with the topography of that portion of the model formed by said layer, the thickness of the layer representing a desired increment in altitude and thereby forming topographical contour lines at the edges of the contacting faces of the superimposed layers when assembled and aligned to form a section, said peripheral edges also serving as a template for drawing contour lines represented by the respective edges, and an orientation mark located on a peripheral surface of each layer, said orientation marks forming a vertical line when said layers are superimposed and aligned, said orientation marks thereby also determining the position of each template layer in relation to an already drawn contour line.

2. The geological teaching device of claim 1 wherein a base is provided to support the sections, and wherein cooperating means are formed in the base and sections to align the sections on the base to form and maintain the model.

* * * * *